United States Patent
Bouazizi et al.

(10) Patent No.: US 10,033,658 B2
(45) Date of Patent: Jul. 24, 2018

(54) METHOD AND APPARATUS FOR RATE ADAPTATION IN MOTION PICTURE EXPERTS GROUP MEDIA TRANSPORT

(71) Applicant: Samsung Electronics Co., LTD, Suwon-si, Gyeonggi-do (KR)

(72) Inventors: Imed Bouazizi, Plano, TX (US); Meng Xu, Santa Clara, CA (US); Zhan Ma, San Jose, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 615 days.

(21) Appl. No.: 14/150,591

(22) Filed: Jan. 8, 2014

(65) Prior Publication Data

US 2014/0379903 A1 Dec. 25, 2014

Related U.S. Application Data

(60) Provisional application No. 61/837,432, filed on Jun. 20, 2013.

(51) Int. Cl.
*G06F 15/16* (2006.01)
*H04L 12/911* (2013.01)
(Continued)

(52) U.S. Cl.
CPC ........ *H04L 47/74* (2013.01); *H04L 29/06027* (2013.01); *H04L 65/602* (2013.01);
(Continued)

(58) Field of Classification Search
CPC ..... H04L 47/74; H04L 65/602; H04L 65/607; H04N 21/00; H04N 21/2402;
(Continued)

(56) References Cited

U.S. PATENT DOCUMENTS 5,136,386 A * 8/1992 Okada .................. H04N 5/21
348/622
8,311,102 B2 11/2012 Lu et al.
(Continued)

FOREIGN PATENT DOCUMENTS

| CN | 1833391 A | 9/2006 |
| CN | 101874407 A | 10/2010 |

(Continued)

OTHER PUBLICATIONS

International Search Report dated Sep. 18, 2014 in connection with International Patent Application No. PCT/KR2014/005314, 4 pages.
(Continued)

*Primary Examiner* — Zarni Maung (57) ABSTRACT

Apparatus and methods for a Motion Picture Experts Group (MPEG) media transport (MMT) device for sending or receiving media content is provided. The MMT device comprises a memory unit and a controller. The controller is configured to measure an available bandwidth, receive fragments of a first encoded stream of the media content and fragments of a second encoded stream of the same media content based on the available bandwidth and a current transmission bandwidth. A mixed encoded stream comprises the fragments received from the first encoded stream and the fragments received from the second encoded stream.

17 Claims, 5 Drawing Sheets

(51) Int. Cl.
*H04L 29/06* (2006.01)
*H04N 21/00* (2011.01)
*H04N 21/24* (2011.01)
*H04N 21/2662* (2011.01)
*H04N 21/643* (2011.01)
*H04N 21/6437* (2011.01)
*G06F 12/00* (2006.01)

(52) U.S. Cl.
CPC ........... *H04L 65/607* (2013.01); *H04N 21/00* (2013.01); *H04N 21/2402* (2013.01); *H04N 21/2662* (2013.01); *H04N 21/6437* (2013.01); *H04N 21/64322* (2013.01)

(58) Field of Classification Search
CPC ......... H04N 21/2662; H04N 21/64322; H04N 21/6437; H04N 21/8456; H04N 21/234309; H04N 21/23439; H04N 21/44004; H04N 21/64738; H04N 21/44209; H04N 21/6125; H04N 21/6373; H04N 19/115; H04N 19/154; H04N 19/19; H04N 21/2187; H04N 21/23406
See application file for complete search history.

(56) References Cited

U.S. PATENT DOCUMENTS

| | | | |
|---|---|---|---|
| 2004/0010565 A1* | 1/2004 | Hong | G01C 21/26 709/217 |
| 2004/0027452 A1* | 2/2004 | Yun | H04N 7/17336 348/51 |
| 2005/0002337 A1 | 1/2005 | Wang et al. | |
| 2005/0013269 A1 | 1/2005 | Han et al. | |
| 2005/0213503 A1 | 9/2005 | Guo et al. | |
| 2005/0235308 A1 | 10/2005 | Dellow et al. | |
| 2007/0258418 A1* | 11/2007 | Wurtenberger | H04L 29/06027 370/338 |
| 2008/0115185 A1* | 5/2008 | Qiu | H04N 21/2343 725/118 |
| 2009/0144792 A1 | 6/2009 | Fielibert et al. | |
| 2011/0093617 A1 | 4/2011 | Igarashi | |
| 2011/0116772 A1 | 5/2011 | Kwon et al. | |
| 2011/0122939 A1* | 5/2011 | Ganesan | H04N 19/115 375/240.01 |
| 2011/0145430 A1 | 6/2011 | Ha et al. | |
| 2012/0027093 A1* | 2/2012 | Amon | H04N 7/152 375/240.16 |
| 2012/0117261 A1* | 5/2012 | Bouazizi | H04L 65/1069 709/231 |
| 2012/0259994 A1 | 10/2012 | Gillies et al. | |
| 2012/0314763 A1 | 12/2012 | Kuhtz | |
| 2012/0317308 A1 | 12/2012 | Penner et al. | |
| 2013/0016791 A1* | 1/2013 | Collard | H04L 65/607 375/240.25 |
| 2013/0067108 A1* | 3/2013 | Nooney | H04L 65/4084 709/231 |
| 2013/0070839 A1 | 3/2013 | Magee | |
| 2013/0103849 A1* | 4/2013 | Mao | H04N 21/8456 709/231 |
| 2013/0170435 A1* | 7/2013 | Dinan | H04L 45/50 370/328 |
| 2014/0089469 A1* | 3/2014 | Ramamurthy | H04L 65/60 709/219 |
| 2014/0143440 A1* | 5/2014 | Ramamurthy | H04N 21/23439 709/231 |
| 2014/0269401 A1* | 9/2014 | Gondi | H04L 43/0876 370/253 |
| 2014/0286169 A1* | 9/2014 | Gunduzhan | H04L 47/10 370/235 |
| 2015/0101003 A1* | 4/2015 | Bull | H04N 21/64761 725/116 |

FOREIGN PATENT DOCUMENTS

| | | |
|---|---|---|
| EP | 2587824 A1 | 5/2013 |
| JP | 2004088621 A | 3/2004 |
| JP | 2004193990 A | 7/2004 |
| JP | 2005039775 A | 2/2005 |
| JP | 2011087103 A | 4/2011 |
| JP | 2013513329 A | 4/2013 |
| KR | 10 2011-0133412 A | 12/2011 |
| KR | 10 2013-0040144 A | 4/2013 |
| WO | 2012138909 A1 | 10/2012 |

OTHER PUBLICATIONS

Written Opinion of International Searching Authority dated Sep. 18, 2014 in connection with International Patent Application No. PCT/KR2014/005314, 5 pages.
State Intellectual Property Office of China, Notification of the First Office Action, dated Dec. 4, 2017, regarding Application No. 201480035476.7, 34 pages.
Notification of Reason for Rejection regarding Japanese Patent Application No. 2016-521197, dated May 8, 2018, 11 pages.

\* cited by examiner

METHOD AND APPARATUS FOR RATE ADAPTATION IN MOTION PICTURE EXPERTS GROUP MEDIA TRANSPORT

CROSS-REFERENCE TO RELATED APPLICATION(S) AND CLAIM OF PRIORITY

The present application claims priority to U.S. Provisional Patent Application Ser. No. 61/837,432, filed Jun. 20, 2013, entitled "METHOD AND APPARATUS FOR RATE ADAPTATION IN MMT". The content of the above-identified patent document is incorporated herein by reference.

TECHNICAL FIELD

The present application relates generally to transferring media content and, more specifically, to transferring media content via Motion Picture Experts Group (MPEG) media transport (MMT).

BACKGROUND

Mobile video traffic has increased to account for more than half of the mobile networks' traffic in 2012 and this number is estimated to reach two thirds by 2017. The mobile data traffic is expected to increase by a factor of eight during the same time frame.

This trend has a significant impact on mobile operators and the dimensioning of their core networks. Important challenges and trade-offs arise when dealing with this trend. For instance, how to make optimal use of the network capacity and how to dimension the network appropriately.

SUMMARY

A Motion Picture Experts Group (MPEG) media transport (MMT) device for sending or receiving media content is provided. The MMT device comprises a memory unit and a controller. The controller is configured to measure an available bandwidth, receive fragments of a first stream of the media content and fragments of a second stream of the media content based on the available bandwidth and a current transmission bandwidth. A mixed stream comprises the fragments received from the first stream and the fragments received from the second stream.

An MMT device for sending media content is provided. The MMT device comprises a memory unit and a controller. The controller is configured to measure an available bandwidth and switch from sending fragments of a first stream of the media content to sending fragments of a second stream of the media content based on the available bandwidth and a current transmission bandwidth. A mixed stream comprises the fragments sent of the first stream and the fragments sent of the second stream.

A method for transferring media content is provided. The method comprises measuring an available bandwidth and switching from sending fragments of a first stream of the media content to sending fragments of a second stream of the media content based on the available bandwidth and a current transmission bandwidth. A mixed stream comprises the fragments sent of the first stream and the fragments sent of the second stream.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Motion Picture Experts Group (MPEG) media transport (MMT) specifies a modern media delivery solution to enable realization of multimedia services over heterogeneous IP network environments. The delivered coded media data includes both audiovisual media data requiring synchronized decoding and presentation of specific unit of data in a designated time, namely timed data, and other types of data could be decoded and presented in an arbitrary time based on the context of the service or based on interaction by the user, namely non-timed data.

MMT is designed so that coded media data is delivered through a packet-based delivery network using Internet Protocols such as UDP. Several characteristics of such delivery environments include that an end-to-end delay of delivery of each packet from the sending entity to the receiving entity is not always constant. Also, the underlying network provides means to distinguish signaling messages from the media data.

For efficient and effective delivery of coded media data over heterogeneous IP network environments, MMT provides the following elements:

a logical model to construct a content composed of various components for mash-up applications;

a structure of data conveying information about the coded media data for the delivery layer processing such as packetization and adaptation;

a packetization method and a packet structure to deliver media is independent of a specific type of media or coding method used over transmission control protocol (TCP) or user defined protocol (UDP), including hybrid delivery;

a format of signaling messages to manage presentation and delivery of media content; and a format of information to be exchanged across communication layers to facilitate cross layer communication.

Figure 1:
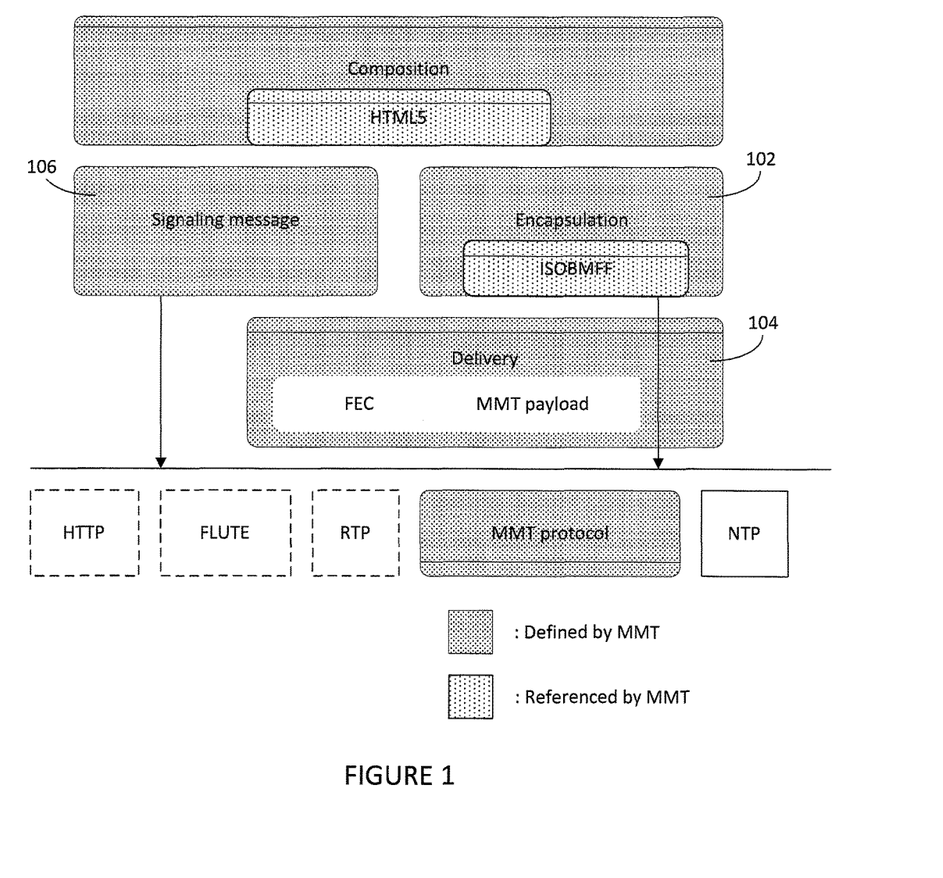
FIG. 1 illustrates three functional areas defined by MMT according to embodiments of the present disclosure.

FIG. 1 illustrates three functional areas defined by MMT according to embodiments of the present disclosure. The embodiment shown in FIG. 1 is for illustration only. Other embodiments could be used without departing from the scope of this disclosure.

Encapsulation layer 102 defines a logical structure of the media content, the MMT Package, and the format of the data units to be processed by the MMT compliant entity, which can use the International Standards Organization base media file format (ISOBMFF). The MMT Package specifies the components comprising media content and the relationship among them to provide necessary information for presentation and adaptive delivery. The format of the data units is defined to encapsulate the coded media to be stored or carried as a payload of a delivery protocol and the format further is defined to be easily converted between different delivery protocols.

The delivery functional area 104 defines an application layer protocol and format of a payload. The application layer protocol provides enhanced features, including multiplexing, for delivery of an MMT Package as compared to conventional application layer protocols for delivery of multimedia. The payload format is defined to carry coded media data that is independent of the specific media type or encoding method.

The signaling functional area 106 defines the format of messages to manage delivery and consumption of MMT packages. Messages for consumption management are used to signal the structure of MMT Package and messages for delivery management are used signal the structure of payload format and configuration of the protocol.

With the tremendous growth of video streaming over the Internet and mobile and cellular networks, it becomes increasingly challenging to deal with the enormous amount of traffic. Rate adaptation ensures scalability of video streaming applications and their responsiveness to congestion signals, in order to relieve the congestion and ensure service continuity. A recent trend is to perform video streaming over hypertext transfer protocol (HTTP), which in turn is deployed over TCP/internet protocol (IP), yielding built in congestion control. In a network congestion situation, TCP will throttle back the throughput that results in playback interruptions if no appropriate rate adaptation is performed at the application layer. In this case, rate adaptation is mainly the responsibility of the client, as no session is typically maintained at the server.

In the case of media streaming over UDP/IP, e.g. using real-time transport protocol (RTP) or MMT, the sender is responsible for rate adaptation. Upon detecting congestion, the sender needs to adjust its transmission rate to not unnecessarily contribute to worsening the congestion and causing more packet losses and distortions at the receivers.

Figure 2:
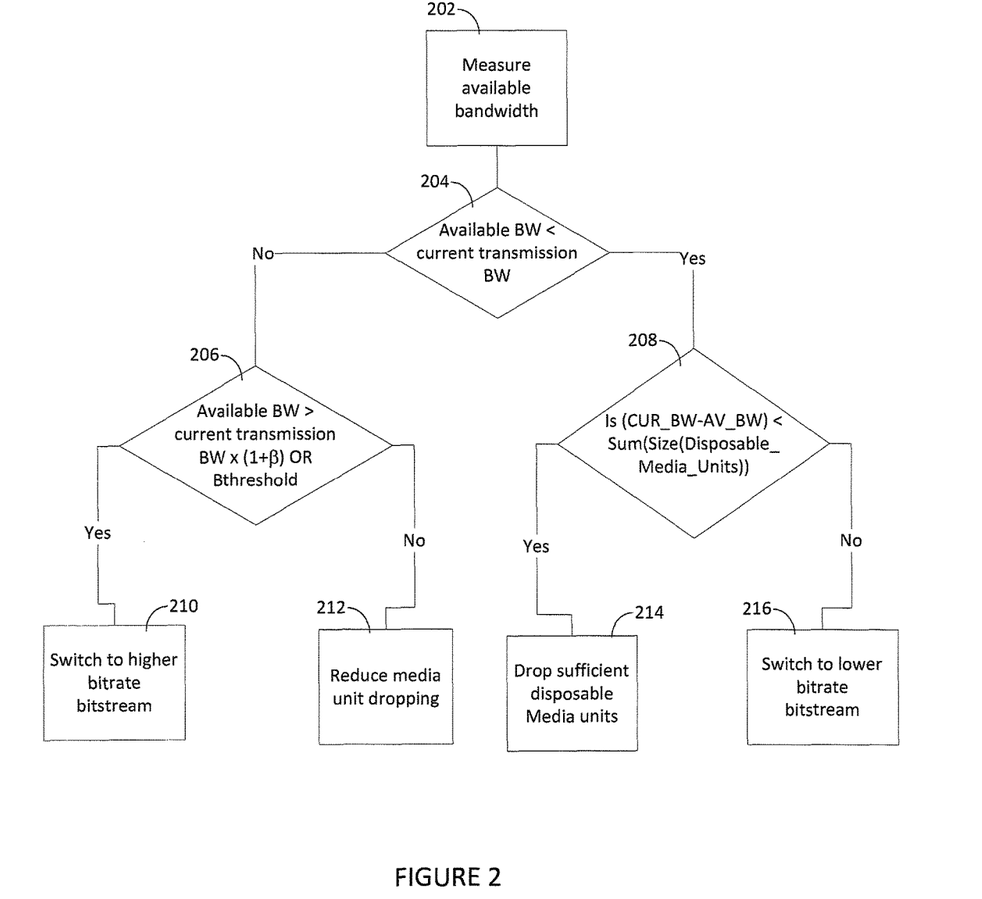
FIG. 2 illustrates a diagram for bitstream switching seamlessly in an MMT session by an apparatus according to embodiments of the present disclosure.

FIG. 2 illustrates a process for bitstream switching seamlessly in an MMT session by an apparatus according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In the process shown in FIG. 2, rate adaptation is performed using a limited set or rate adaptation techniques, such as frame and slice dropping and bitstream switching. Embodiments of the present disclosure provide a method and apparatus to perform rate adaptation when using MMT for streaming media data. In certain embodiments, an MMT sender, such as MMT server 504 of FIG. 5, continuously checks the available bandwidth to the client or set of clients. The MMT server 504 can check the available bandwidth through active measurements of the bandwidth or through feedback reports from the client(s). Thereafter, MMT server 504 assesses a need for rate adaptation and, if there is need, MMT server 504 checks first if the target bitrate (which is usually lower than the available bitrate) can be achieved through temporary bitstream thinning. If MMT server 504 cannot achieve the target bitrate, then MMT server 504 switches bitstreams to a lower bitrate bitstream. If the available bandwidth is sufficiently larger than the current transmission bitrate, MMT server 504 switches to a higher bitrate bitstream.

Figure 5:
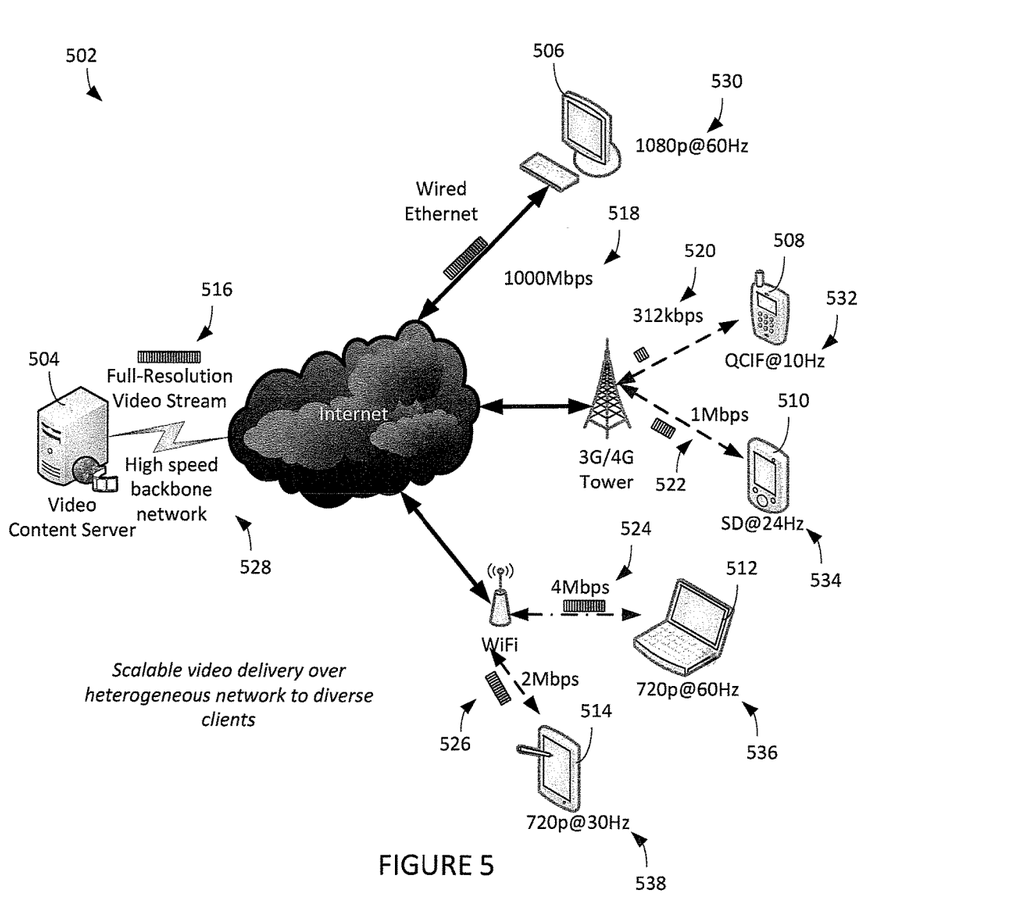
FIG. 5 illustrates scalable video delivery over a heterogeneous network to diverse clients according to embodiments of the present disclosure.

MMT server 504 performs bitstream thinning by dropping MMT protocol (MMTP) packets that contain less important media data. Those less important media data are disposable, in the sense that, dropping them will not result in error propagation.

In block 202, an MMT device measures an available bandwidth. The MMT device can be MMT server 504, which sends the content. The MMT device also can be one of MMT clients 506-514 that receives the content and decides whether to request MMT server 504 to switch to a different bitrate based on the available bandwidth. The MMT device also determines whether MMT server 504 needs to drop media fragment units (MFUs), when the fragments 310 are sent to MMT clients 506-514 based on the available bandwidth.

In block 204, the MMT device compares the available bandwidth to bandwidth of the current transmission. If the available bandwidth is not less than the current transmission bandwidth, then the process continues to block 206. If the available bandwidth is less than the current transmission, then the process continues to block 208.

In block 206, the MMT device compares the available bandwidth to one or more of the current transmission bandwidth times a factor of 1+β and a threshold. If the available bandwidth is greater than the one or more of the current transmission bandwidth times a factor of 1+β and a threshold, then the process continues to block 210. If the available bandwidth is not greater than the one or more of the current transmission bandwidth times a factor of 1+β and a threshold, then the process continues to block 212.

In block 208, the MMT device is compares the current bandwidth and the available bandwidth to a sum of sizes of one or more disposable media units. If the current bandwidth minus the available bandwidth is less than the sum of the sizes of the disposable media units, then the process continues to block 214. If the current bandwidth minus the available bandwidth is not less than the sum of the sizes of the disposable media units, then the process continues to block 214.

In block 210, the MMT device switches to a higher bitrate bitstream. The MMT device initiates the switch based on one or more of available bandwidth, current bandwidth, and a sum of sizes of disposable media units.

In block 212, the MMT device reduces media unit dropping. The MMT device performs the reduction based on one or more of available bandwidth, current bandwidth, and a sum of sizes of disposable media units.

In block 214, the MMT device drops a sufficient number of disposable media units. The MMT device calculates a number of disposable media units. When calculated by one of MMT clients 506-514, the MMT device signals the number of disposable media units to be dropped to MMT server 504. MMT server 504 drops the number of disposable media units by not sending certain disposable media units to the MMT clients 506-514 based on one or more of available bandwidth, current bandwidth, and a sum of sizes of disposable media units.

In block 216, the MMT device switches to a lower bit rate bitstream. The MMT device initiates the switch based on one or more of available bandwidth, current bandwidth, and a sum of sizes of disposable media units.

Figure 3:
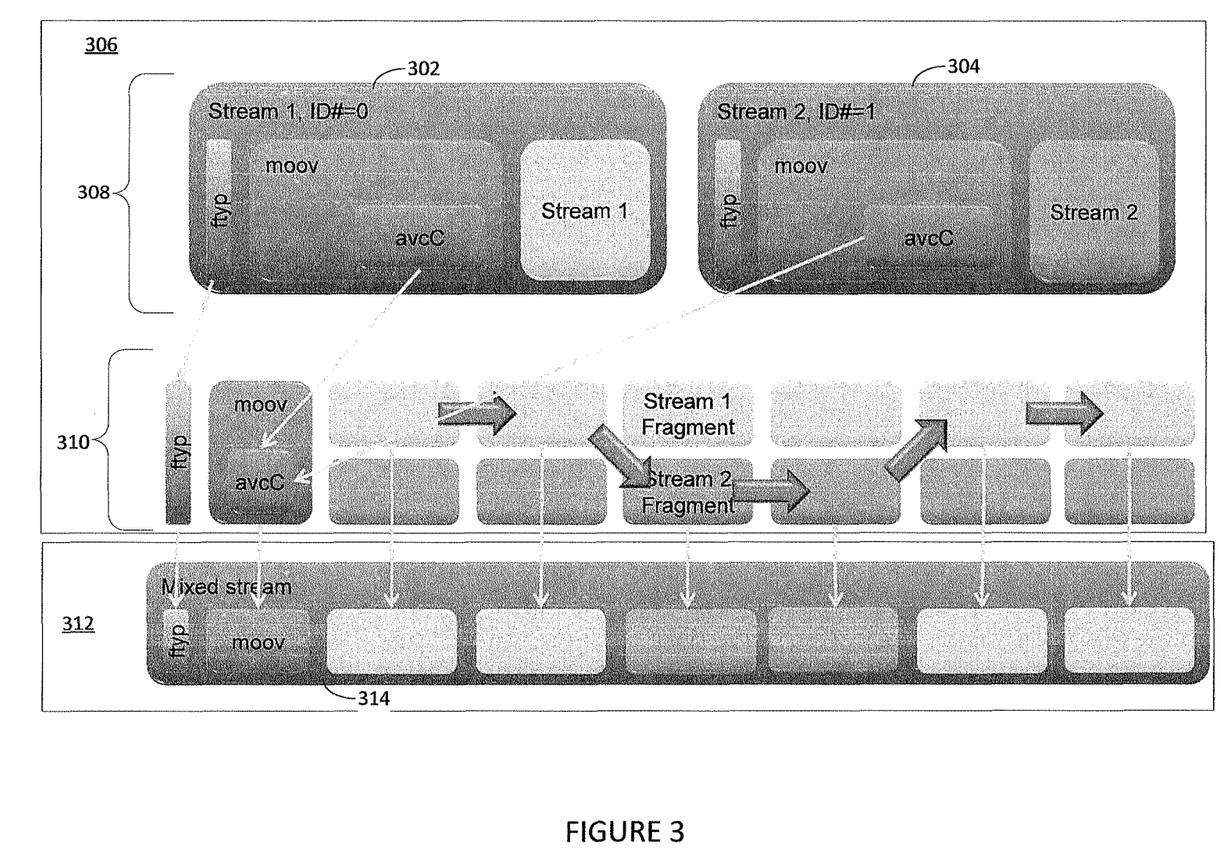
FIG. 3 illustrates bitstream switching seamlessly in an MMT session by an MMT device according to embodiments of the present disclosure.

FIG. 3 illustrates bitstream switching seamlessly in an MMT session by an MMT device according to embodiments of the present disclosure. The embodiment shown in FIG. 3 is for illustration only. Other embodiments could be used without departing from the scope of this disclosure.

MMT server 306, which can be an embodiment of MMT server 504 of FIG. 5, has access to multiple encodings 308 of an asset or media file, each at a different bitrate, such as first stream 302 and second stream 304. MMT server 306 creates common media processing unit (MPU) metadata for each MPU at all available bitstreams. MMT server 306 performs bitstream switching at a movie fragment level. MMT server 306 checks the available bitrate and MMT server 306 decides whether to switch to a higher or lower bitrate based on the available bitrate. MMT server 306 also decides whether to drop media fragment units (MFUs) based on the available bitrate, when the fragments 310 are sent to MMT client 312. By creating a common MPU header, MMT server 306 performs the switching transparently and seamlessly to MMT client 312, since the media decoders would not have to be re-initialized again. MMT client 312 is configured to receive mixed stream 314 from MMT server 306 that includes fragments from different streams 302 and 304. The fragments use different encodings, but use common headers and metadata to allow the fragments from different streams to be combined into the single mixed stream 314 that can be received, decoded, and presented by MMT client 312.

In certain embodiments, MMT server 306 uses additional metadata from a content provider to decide whether to drop media units or to switch to a lower bitrate bitstream. The content provider can recommend a minimum frame rate for a video bitstream for a specific period of time. MMT server 306 stops dropping media units if the resulting bitstream will have a frame rate lower than the recommended frame rate and then switches to a lower bitrate bitstream.

In certain embodiments, MMT server 306 uses the information in the MMT Fragment Header and the information in the MFU header to pre-calculate which media units are dropped. MMT server 306 determines sizes for media units that can be dropped to pre-calculate which media units to drop from the media units that can be dropped.

In certain embodiments, media content is encoded at one or more bitrates and MMT server 306 has access to one or more encodings of the media content encoded respectively at the one or more bitrates. MMT server 306 groups configuration information for the different encodings of the media content at and makes the grouped configuration information available to MMT client 312. MMT server 306 groups media data from the different encodings into content fragments, and selects one content fragment to transmit to MMT client 312 at a particular point of time. The transmitted content fragments have minimal time overlap, not exceeding one or more media samples.

Figure 4:
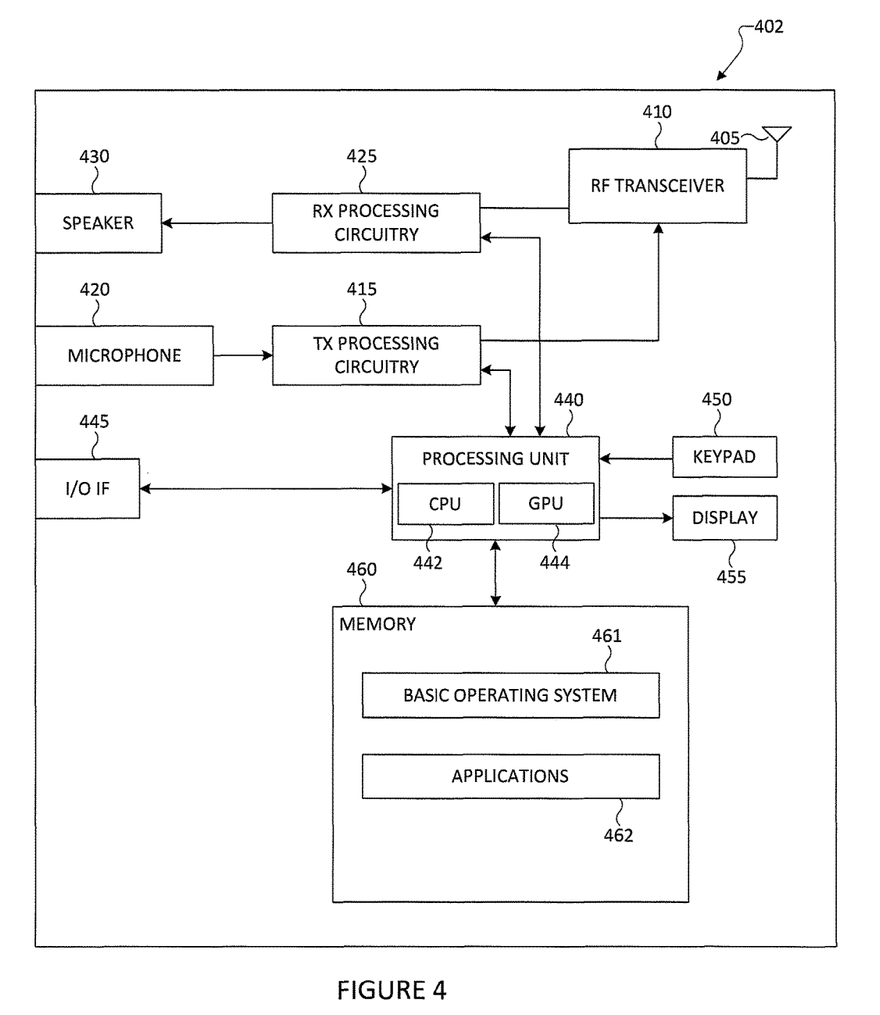
FIG. 4 illustrates an electronic device according to embodiments of the present disclosure.

FIG. 4 illustrates an electronic device according to embodiments of the present disclosure. The embodiment of an electronic device shown in FIG. 4 is for illustration only. Other embodiments of an electronic device could be used without departing from the scope of this disclosure.

Electronic device 402 and comprises one or more of antenna 405, radio frequency (RF) transceiver 410, transmit (TX) processing circuitry 415, microphone 420, and receive (RX) processing circuitry 425. Electronic device 402 also comprises one or more of speaker 430, processing unit 440, input/output (I/O) interface (IF) 445, keypad 450, display 455, and memory 460. Processing unit 440 includes processing circuitry configured to execute a plurality of instructions stored either in memory 460 or internally within processing unit 440. Memory 460 further comprises basic operating system (OS) program 461 and a plurality of applications 462. Electronic device 402 is an embodiment of an MMT device, such as a mobile station (MS), MMT server 306 of FIG. 3, MMT Server 504 of FIG. 5, MMT client 312 of FIG. 3, MMT clients 506-514 of FIG. 5, and so forth. Electronic device 402 sends, receives, or displays media content via MMT.

Radio frequency (RF) transceiver 410 receives from antenna 405 an incoming RF signal transmitted by a base station of wireless network 400. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to processing unit 440 for further processing (e.g., web browsing).

Transmitter (TX) processing circuitry 415 receives analog or digital voice data from microphone 420 or other outgoing baseband data (e.g., web data, e-mail, interactive video game data) from processing unit 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In certain embodiments, processing unit 440 comprises circuitry for a central processing unit (CPU) 442 and a graphics processing unit (GPU) 444 embodied in one or more discrete devices. Memory 460 is coupled to processing unit 440. According to some embodiments of the present disclosure, part of memory 460 comprises a random access memory (RAM) and another part of memory 460 comprises a Flash memory, which acts as a read-only memory (ROM).

In certain embodiments, memory 460 is a computer readable medium that comprises program instructions to transfer media content via MMT. When the program instructions are executed by processing unit 440, the program instructions are configured to cause one or more of processing unit 440, CPU 442, and GPU 444 to execute various functions and programs in accordance with embodiments of the present disclosure. According to certain embodiments of the present disclosure, CPU 442 and GPU 444 are comprised as one or more integrated circuits disposed on one or more printed circuit boards.

Processing unit 440 executes basic operating system (OS) program 461 stored in memory 460 in order to control the overall operation of wireless electronic device 402. In one such operation, processing unit 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Processing unit 440 is capable of executing other processes and programs resident in memory 460, such as operations for encoding or decoding a bitstream via a scalable video codec using a deringing filter as described in embodiments of the present disclosure. Processing unit 440 can move data into or out of memory 460, as required by an executing process. In certain embodiments, the processing unit 440 is configured to execute a plurality of applications 462. Processing unit 440 can operate the plurality of applications 462 based on OS program 461 or in response to a signal received from a base station. Processing unit 440 is also coupled to I/O interface 445. I/O interface 445 provides electronic device 402 with the ability to connect to other devices such as laptop computers, handheld computers, and server computers. I/O interface 445 is the communication path between these accessories and processing unit 440.

Processing unit 440 is also optionally coupled to keypad 450 and display unit 455. An operator of electronic device 402 uses keypad 450 to enter data into electronic device 402. Display 455 may be a liquid crystal display capable of rendering text and/or at least limited graphics from web sites. Alternate embodiments may use other types of displays.

FIG. 5 illustrates scalable video delivery over a heterogeneous network to diverse clients according to embodiments of the present disclosure. The embodiment shown in FIG. 5 is for illustration only. Other embodiments could be used without departing from the scope of this disclosure.

A heterogeneous network 502 includes MMT server 504 that serves media content including images, audio, and video to MMT clients 506-514. MMT server 504 and MMT clients 506-514 are MMT devices and are embodiments of electronic device 402. MMT server 504 sends full resolution video stream 516 via heterogeneous network 502 to be received by MMT clients 506-514. MMT clients 506-514 receive some or all of full resolution video stream 516 via one or more bit rates 518-526 and one or more resolutions 530-538 based on a type of connection to heterogeneous network 502, a type of the MMT client, and a congestion of the network. The types and bit rates of connections to heterogeneous network 502 include high speed backbone network connection 528, 1000 megabit per second (Mbps) connection 518, 312 kilobit per second (kbps) connection 520, 1 Mbps connection 522, 4 Mbps connection 524, 2 Mbps connection 526, and so forth. The one or more resolutions 530-538 include 1080 progressive (1080p) at 60 Hertz (1080p @ 60 Hz) 530, quarter common intermediate format (QCIF) @ 10 Hz 532, standard definition (SD) @ 24 Hz 534, 720 progressive (720p) @ 60 Hz 536, 720p @ 30 Hz 538, et cetera. Types of clients 506-514 include desktop computer 506, mobile phone 508, personal digital assistant (PDA) 510, laptop 512, tablet 514, et cetera.

When heterogeneous network 502 is congested, MMT server 504 starts or increases dropping of MFUs of the video stream sent to MMT clients 506-514 and MMT server 504 sends MFUs of lower resolution using lower bitrates to MMT clients 506-514. When congestion of heterogeneous network 502 is reduced, MMT server 504 reduces dropping of MFUs of the video stream sent to MMT clients 506-514 and MMT server 504 sends MFUs of higher resolution using higher bitrates to MMT clients 506-514.

Although various features have been shown in the figures and described above, various changes may be made to the figures. For example, the size, shape, arrangement, and layout of components shown in FIGS. 1 and 3 through 5 are for illustration only. Each component could have any suitable size, shape, and dimensions, and multiple components could have any suitable arrangement and layout. Also, various components in FIGS. 1 and 3 through 5 could be combined, further subdivided, or omitted and additional components could be added according to particular needs. Further, each component in a device or system could be implemented using any suitable structure(s) for performing the described function(s). In addition, while FIG. 2 illustrates various series of steps, various steps in FIG. 2 could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A Motion Picture Experts Group (MPEG) media transport (MMT) client device for receiving media content, the MMT client device comprising:
 a memory unit; and
 a controller configured to:
  receive fragments of a first encoded stream of the media content and fragments of a second encoded stream of the same media content based on an available bandwidth and a current transmission bandwidth,
  wherein a mixed encoded stream comprises the fragments received from the first encoded stream and the fragments received from the second encoded stream; and
  adjust dropping the fragments of the first encoded stream prior to requesting fragments from the second encoded stream,
  wherein the adjusting comprises reducing dropping media fragment units (MFUs) if the available bandwidth is not less than the current transmission bandwidth and the available bandwidth is not greater than one of the current transmission bandwidth times a factor of 1+β and a threshold.

2. The MMT client device of claim 1, wherein:
the adjusting comprises dropping sufficient MFUs if the available bandwidth is less than the current transmission bandwidth and the current bandwidth minus the available bandwidth is less than a sum of a size of one or more disposable media units.

3. The MMT client device of claim 1, wherein:
the second encoded stream is associated with a lower bitrate and is switched to if the available bandwidth is less than the current transmission bandwidth and the current bandwidth minus the available bandwidth is not less than a sum of a size of one or more disposable media units, and
the second encoded stream is associated with a higher bitrate and is switched to if the available bandwidth is not less than the current transmission bandwidth and the available bandwidth is greater than one of the current transmission bandwidth times a factor of 1+β and a threshold.

4. The MMT client device of claim 1, wherein the fragments sent of the first encoded stream and the fragments sent of the second encoded stream have a minimal time overlap not exceeding one or more media samples.

5. The MMT client device of claim 1, wherein:
the adjusting is based on additional metadata from a content provider,
the additional metadata is configured to indicate a minimum frame rate for a specific period of time,
the dropping is stopped if the frame rate from the dropping is lower than a recommended frame rate, and
the second encoded stream is associated with a lower bitrate and is switched to if the frame rate from the dropping is lower than the recommended frame rate.

6. The MMT client device of claim 1, wherein information in an MMT Fragment Header and information in MFU of the media content is used to pre-calculate which MFUs are to be dropped.

7. A Motion Picture Experts Group (MPEG) media transport (MMT) server device for sending media content, the MMT device comprising:
a memory unit; and
a controller configured to:
measure an available bandwidth;
in response to determining a need for rate adaptation, switch from sending fragments of a first encoded stream of the media content to sending fragments of a second encoded stream of the same media content based on a comparison between the available bandwidth and a current transmission bandwidth,
wherein the switch is performed at a movie fragment level, and
wherein a mixed encoded stream comprises the fragments sent of the first encoded stream and the fragments sent of the encoded second stream; and
adjust dropping the fragments of the first encoded stream prior to the switching from the first encoded stream to the second encoded stream,
wherein the adjusting comprises reducing dropping media fragment units (MFUs) if the available bandwidth is not less than the current transmission bandwidth and the available bandwidth is not greater than one of the current transmission bandwidth times a factor of 1+β or a threshold.

8. The MMT server device of claim 7, wherein:
the adjusting comprises dropping sufficient MFUs if the available bandwidth is less than the current transmission bandwidth and the current bandwidth minus the available bandwidth is less than a sum of a size of one or more disposable media units.

9. The MMT server device of claim 7, wherein:
the second encoded stream is associated with a lower bitrate and the switching comprises switching to the lower bitrate if the available bandwidth is less than the current transmission bandwidth and the current bandwidth minus the available bandwidth is not less than a sum of a size of one or more disposable media units, and
the second encoded stream is associated with a higher bitrate and the switching comprises switching to the higher bitrate if the available bandwidth is not less than the current transmission bandwidth and the available bandwidth is greater than one of the current transmission bandwidth times a factor of 1+β and a threshold.

10. The MMT server of claim 7, wherein the fragments sent of the first encoded stream and the fragments sent of the second encoded stream have a minimal time overlap not exceeding one or more media samples.

11. The MMT server device of claim 7, wherein:
the adjusting is based on additional metadata from a content provider,
the additional metadata is configured to indicate a minimum frame rate for a specific period of time,
the dropping is stopped if the frame rate from the dropping is lower than a recommended frame rate, and
the second encoded stream is associated with a lower bitrate and the switching comprises switching to the lower bitrate if the frame rate from the dropping is lower than the recommended frame rate.

12. The MMT server device of claim 7, wherein information in a Motion Picture Experts Group (MPEG) media transport (MMT) Fragment Header and information in a MFU of the media content is used to pre-calculate which MFUs are to be dropped.

13. A method for transferring media content, the method comprising:
measuring an available bandwidth;
in response to determining a need for rate adaptation, switching from sending fragments of a first encoded stream of the media content to sending fragments of a second encoded stream of the same media content based on a comparison between the available bandwidth and a current transmission bandwidth,
wherein the switch is performed at a movie fragment level, and
wherein a mixed encoded stream comprises the fragments sent of the first encoded stream and the fragments sent of the second encoded stream; and
adjusting dropping the fragments of the first encoded stream prior to the switching from the first encoded stream to the second encoded stream,
wherein the adjusting comprises reducing dropping media fragment units (MFUs) if the available bandwidth is not less than the current transmission bandwidth and the available bandwidth is not greater than one of the current transmission bandwidth times a factor of 1+β and a threshold.

14. The method of claim 13, wherein:
the adjusting comprises dropping sufficient MFUs if the available bandwidth is less than the current transmission bandwidth and the current bandwidth minus the available bandwidth is less than a sum of a size of one or more disposable media units.

15. The method of claim 13, wherein:
the second encoded stream is associated with a lower bitrate and the switching comprises switching to the lower bitrate if the available bandwidth is less than the current transmission bandwidth and the current bandwidth minus the available bandwidth is not less than a sum of a size of one or more disposable media units, and
the second encoded stream is associated with a higher bitrate and the switching comprises switching to the higher bitrate if the available bandwidth is not less than the current transmission bandwidth and the available bandwidth is greater than one of the current transmission bandwidth times a factor of 1+$\beta$ and a threshold.

16. The method of claim 13, wherein the fragments sent of the first encoded stream and the fragments sent of the second encoded stream have a minimal time overlap not exceeding one or more media samples.

17. The method of claim 13, wherein:
the adjusting is based on additional metadata from a content provider,
the additional metadata is configured to indicate a minimum frame rate for a specific period of time,
the dropping is stopped if the frame rate from the dropping is lower than a recommended frame rate, and
the second encoded stream is associated with a lower bitrate and the switching comprises switching to the lower bitrate if the frame rate from the dropping is lower than the recommended frame rate.

* * * * *